United States Patent [19]

Clarke et al.

[11] Patent Number: 5,306,539
[45] Date of Patent: Apr. 26, 1994

[54] SCORED FIBERBOARD HAVING IMPROVED MOLDABILITY

[75] Inventors: John T. Clarke; Egon R. H. Teodorson, Jr., both of St. Charles, Ill.

[73] Assignee: Masonite Corporation, Chicago, Ill.

[21] Appl. No.: 840,677

[22] Filed: Feb. 21, 1992

Related U.S. Application Data

[63] Continuation of Ser. No. 663,202, Feb. 28, 1991, abandoned, which is a continuation of Ser. No. 229,197, Aug. 5, 1988, abandoned.

[51] Int. Cl.⁵ .............................................. B32B 3/00
[52] U.S. Cl. .................................... 428/156; 428/134; 428/136; 428/155; 428/171; 428/174; 428/221; 428/225
[58] Field of Search ............... 428/134, 136, 155, 171, 428/174, 221, 225, 155; 156/219, 257

[56] References Cited

U.S. PATENT DOCUMENTS

| | | | |
|---|---|---|---|
| 992,026 | 7/1909 | Nishimura | 428/187 |
| 2,800,423 | 7/1957 | de Swart | 154/43 |
| 3,314,339 | 4/1967 | Guffy et al. | 93/58.1 |
| 3,481,813 | 12/1969 | Wiggers | 156/211 |
| 3,731,600 | 5/1973 | Earp | 93/58.1 |
| 3,983,827 | 10/1976 | Meadors | 113/121 A |
| 4,342,610 | 8/1982 | Ray, Jr. | 156/62.6 |
| 4,610,900 | 9/1986 | Nishibori | 428/15 |

FOREIGN PATENT DOCUMENTS

| | | |
|---|---|---|
| 248248 | 12/1987 | European Pat. Off. |
| 1384835 | 11/1964 | France |
| 60-224530 | 11/1985 | Japan |
| 96985 | 7/1947 | New Zealand |
| 97000 | 7/1947 | New Zealand |
| 147785 | 10/1968 | New Zealand |
| 165513 | 11/1974 | New Zealand |
| 167656 | 8/1975 | New Zealand |
| 1510412 | 5/1978 | United Kingdom |

Primary Examiner—Ellis P. Robinson
Assistant Examiner—Nasser Ahmad
Attorney, Agent, or Firm—Marshall, O'Toole, Gerstein, Murray & Borun

[57] ABSTRACT

A fiberboard, preferably made by consolidating a water-felted mat without added binder and being suitable for pressure-molding into a hardboard door facing having a high degree of fidelity to the contours of the die set, is incised on both the major face and the obverse face with incisions having a depth of from about 10% to about one third the thickness of the board. The incisions are aligned on lines that are preferably arranged at right angles across the face of the board. The lines are preferably spaced a maximum of about 0.5 inches apart, and the incisions on each line are discontinuous, preferably separated by a maximum of about 0.5 inches.

30 Claims, 5 Drawing Sheets

SCORED FIBERBOARD HAVING IMPROVED MOLDABILITY

CROSS-REFERENCE TO RELATED APPLICATION

This is a continuation of copending, commonly assigned application Ser. No. 07/663,202 filed Feb. 28, 1991, now abandoned, which was a continuation of Ser. No. 07/229,197 filed Aug. 5, 1988, now abandoned.

FIELD OF THE INVENTION

This invention relates to the molding of a composite board of cellulosic fibers between matched die sets to produce a high density, three dimensional board free of stretch marks and fractures. As a result of the new and unique method of this invention, hardboard door facings may be molded with a high degree of fidelity to the contours and angles of the die set bearing the pattern of the desired profile.

BACKGROUND OF THE INVENTION

The fibers of a rigid fiberboard, made by the consolidation of a water-felted mat under heat and pressure, are bound together primarily by hydrogen bonding and mechanical interlocking but also by the lignin native to the fibers. Such a fiberboard is difficult to consolidate into thin, non-planar panels without causing stretch marks and even fractures in deeply molded regions or regions adjacent thereto. In a molding press, the tension and compression forces pull and push the fibers in a rigid fiberboard apart, sometimes to the breaking point. This is a particularly significant problem with fiberboards having little or no resinous binders which would flow in response to said forces to take the place of the relatively inelastic fibers which cannot flow around the contours and angles of the die set.

The fibers of a dry felted wood fiber mat, on the other hand, are loosely bound together by a synthetic thermosetting resin and can flow along with the resin during hot pressure molding.

C. C. Heritage teaches a method for improving the surfaces and strengthening contoured parts of a molded hardboard panel in Canadian Patent No. 572,073. Either dry- or water felted wood fibers may be consolidated and molded to produce contoured hardboard, according to Heritage, by covering felted mats with an overlay of a thermoplastic or thermosetting resin in the form of a film, an impregnated fabric, or a coating.

There is a problem, however, according to the teachings of Nishibori in U.S. Pat. No. 4,610,900, when a synthetic resin is mixed with a cellulosic aggregate prior to molding. The aggregate, such as pulverized wood chips, is added to the resin to prevent the residual internal stress in the molded product which leads to warping and twisting thereof. Large amounts of the cellulosic aggregate, however, hamper the flowability of the resin and produce internal stresses in the resin product to be molded. Nishibori solves the problem by: first, heating and cooling the resin product; second, removing a skin layer of resin from the surface of the product by sanding or sandblasting; and third, cutting grooves out of the resulting exposed surface. This last operation suffers from the disadvantages of loss of the material removed to make the grooves and the expense of waste collection and removal.

BRIEF SUMMARY OF THE INVENTION

There remains a need, therefore, for a simpler, non-destructive, and cheaper way to improve the moldability of consolidated fiberboards, especially the water-felted wood fiberboards. It is an object of this invention to provide such a method.

It is a related object of this invention to provide a rigid board of consolidated fibers which may be molded under pressure to a three dimensional board with high fidelity to the contours and angles of the mold.

It is another object of this invention to provide an improved method for producing deeply molded hardboard from consolidated, water felted wood fiberboards whereby the molded hardboard is free from stretch marks and tears or fractures.

These and other objects which will become apparent from the following description of the invention and the accompanying drawings are achieved by making a plurality of discontinuous incisions into the surface region of a major face of a fiberboard to sever fibers in said region without removing the fibers or other material from said region. For the purposes of this invention, the surface region of a major face of the fiberboard extends inward for about one-third of its thickness. The discontinuous incisions define a line and may be made with a razor blade or similarly sharp cutting instrument having a thin blade but it is preferred to use a cutting disk having circumferentially spaced notches in the blade. The fiberboard may be a dry, consolidated mass of cellulosic fibers such as paper pulp, wood fibers and other lignocellulosic fibers. Its density is in the range of from about 10 to about 28 pounds, preferably up to about 22 pounds, per cubic foot. The invention is particularly advantageous in the molding of fiberboards made from long fibers such as redwood fibers. Although the primary object of the invention is to improve the moldability of wet felted rigid fiberboards having no added binder, the invention is operative with fiberboards containing conventional binders such as resins, starch, tung oil and the like.

BRIEF DESCRIPTION OF THE DRAWINGS

For a fuller understanding of this invention, reference should be made to the drawings, in which.

DETAILED DESCRIPTION OF THE INVENTION

Figure 1:
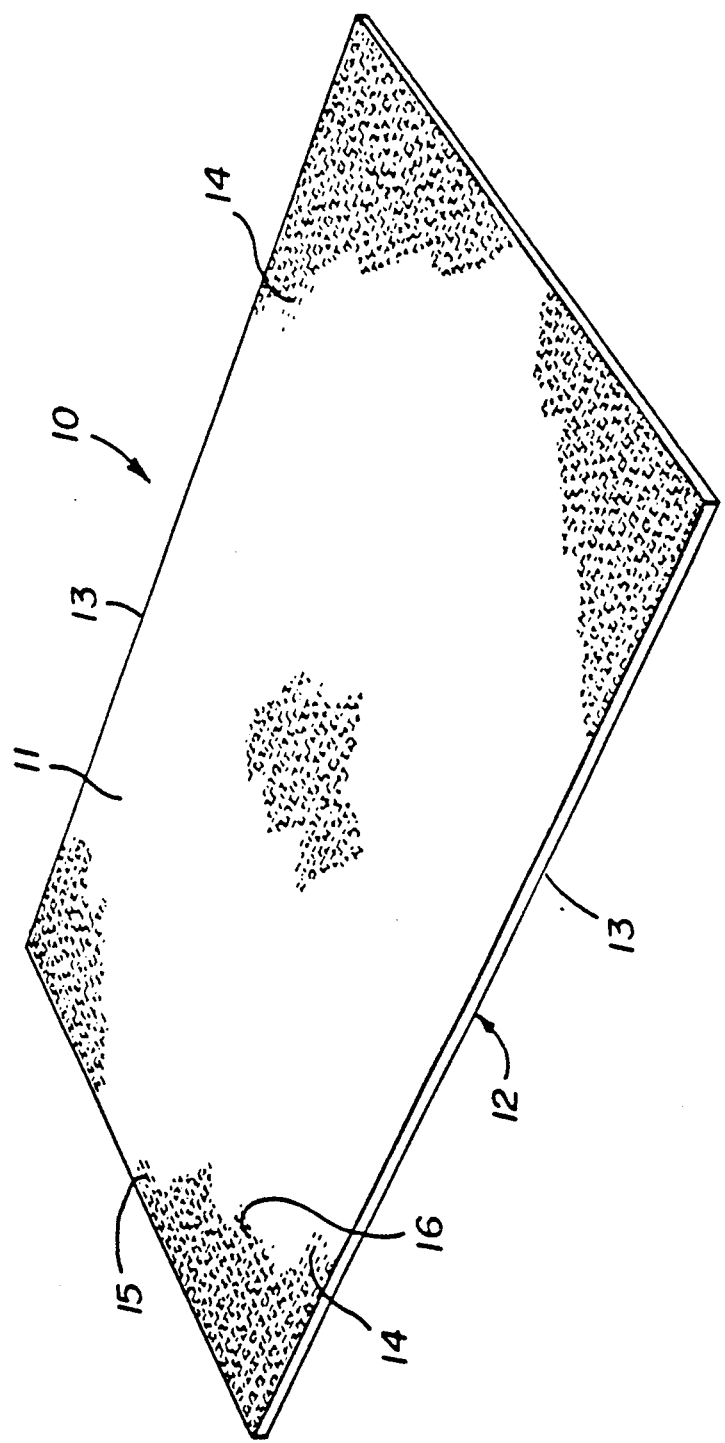
FIG. 1 is a perspective view of a fiberboard having discontinuous incisions therein in accordance with this invention.

In FIG. 1, the scored fiberboard 10 has the upper and lower major faces 11 and 12, respectively, and the longitudinal edges 13. The intermittent incisions 14 in the face 11 lie along imaginary lines parallel to the longitudinal edges and the intermittent incisions 15 lie along imaginary lines perpendicular to those edges. Fibers in the surface region of the board are severed but are not removed from the board. The severed ends of the fibers are displaced initially by the thin blade of a cutting instrument but the consequent compression of the adjacent masses of fiber and binder is relieved somewhat as the blade is removed and as the severed ends of the fibers move back to substantially contiguous positions in response to that compression.

A board having intermittent incisions in only one direction, i.e., along one or more lines parallel to or perpendicular to a longitudinal edge is useful when the design on the molded hardboard is to be unidirectional. Generally, however, it is preferred to make incisions along intersecting lines so that the board is adapted to improved moldability regardless of the orientation of the design on the die set. The intersecting sets of parallel lines defined by the incisions and the discontinuities therebetween are shown in FIG. 1 at right angles to one another but they may meet at acute angles. An advantage of the grid shown is the relative ease of designing and operating an apparatus for scoring a continuously moving board at right angles to the direction of movement as opposed to acute angles. The illustration in FIG. 1 of a grid of incisions on various portions of the face 11 is representative of a grid extending over the entire face of the board. It will also be understood that the face 12 may be incised in like manner.

The discontinuities 16 or intervals of uncut surface between incisions along the imaginary lines have a maximum length of about 0.5 inch but they must be at least about 0.1 inch long. It is these intervals of uncut fibers that preserve the integrity of the face of the board during the molding operation. It has been found that when continuous parallel incisions are made in a dry, water-felted board, the severed fibers pulled apart during the molding operation, leaving gaps in the surface of the molded board which gave it an unsightly, unacceptable appearance.

Figure 2:
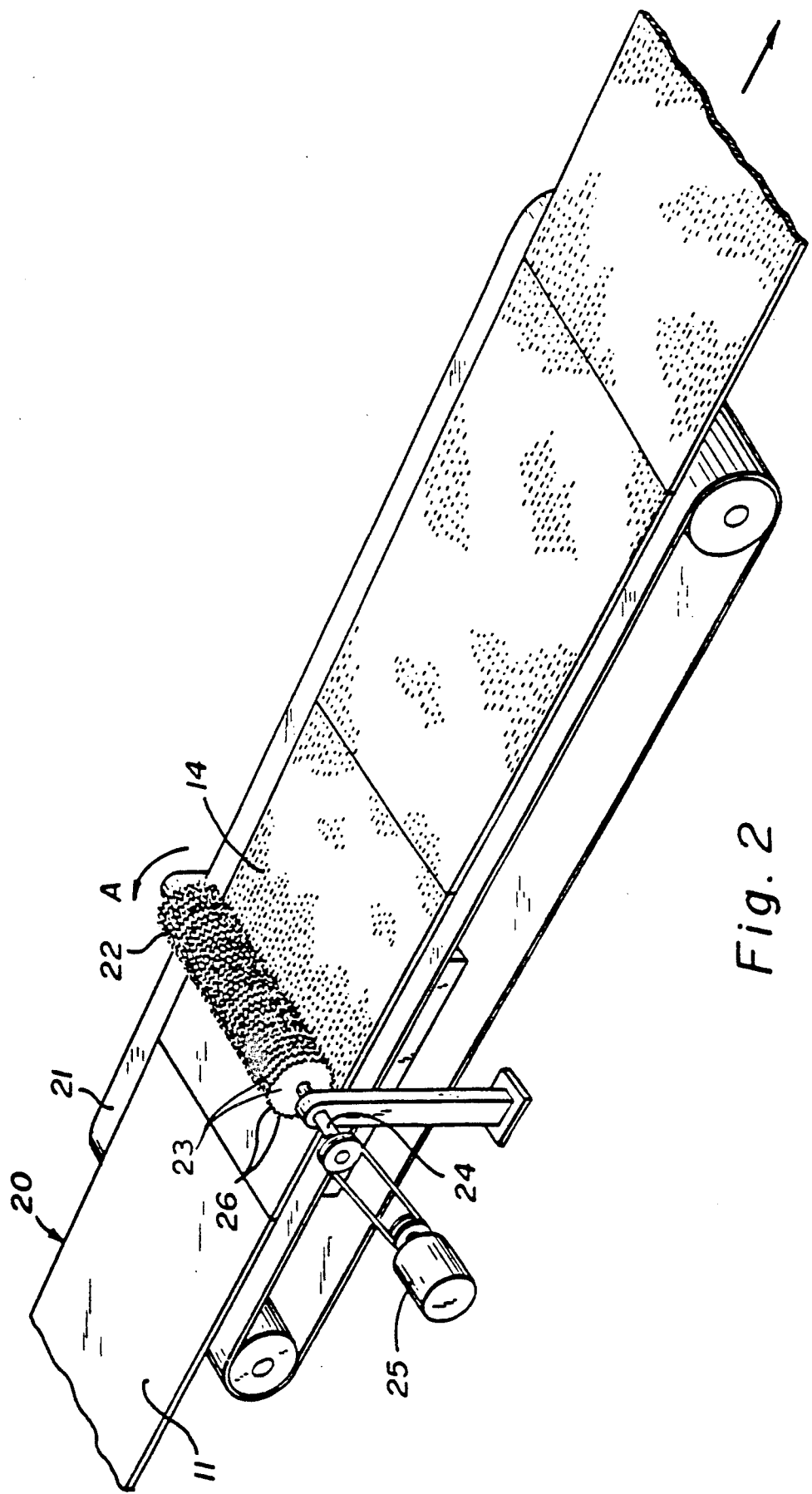
FIG. 2 is a partially cut away perspective view of a fiberboard having discontinuous incisions being made into its upper surface parallel to its longitudinal edges as it moves under an assemblage of co-axially mounted, toothed cutting disks.
Figure 4:
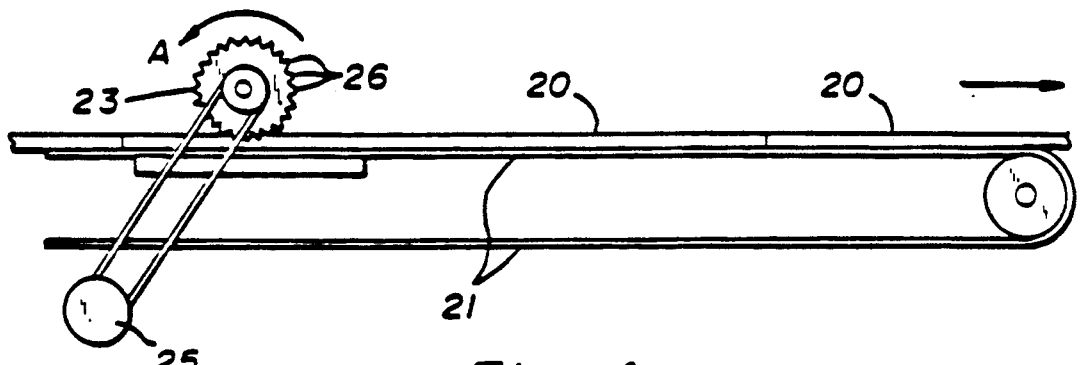
FIG. 4 is a side view of the fiberboard and apparatus of FIG. 2.

In FIG. 2, the fiberboard 20 is moved by the conveyor belt 21 into engagement with the rotating cylinder-like assemblage 22 of toothed cutting disks 23 which are mounted co-axially in spaced apart relation on the shaft 24 which is driven by the motor 25 in the direction indicated by the arrow A. The longitudinal incisions 14 are made as the deltoid teeth or blades 26 cut into the surface region of the face 11, as shown more clearly in FIG. 4.

As mentioned earlier, the incisions may be made by a razor blade, severance rather than separation of the fibers being a critical feature of this method, along with the intermittency of the incisions. Because of the limitations of strength of extremely thin blades, however, the blades 26 are preferably wedge-shaped, having a thickness of as much as about 0.1 inch at their origin on the disk 23 and a razor thin cutting edge.

Figure 3:
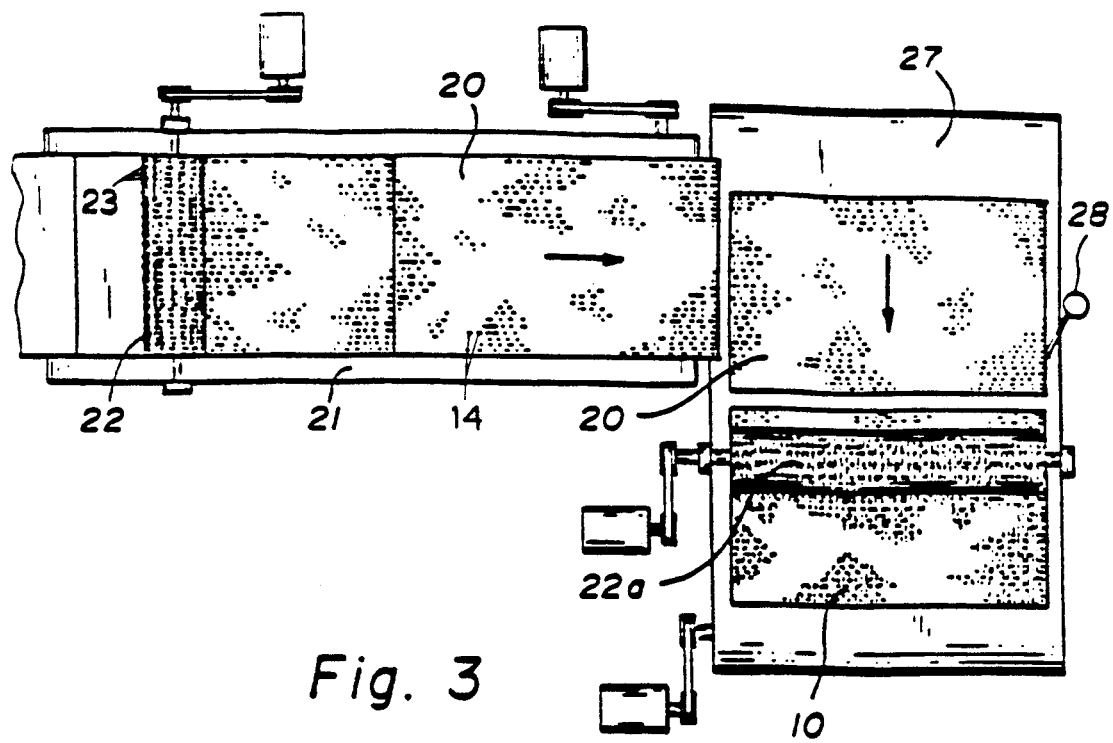
FIG. 3 is a top plan view of the apparatus of FIG. 2 in association with a similar apparatus set at right angles to the other.

In FIG. 3, the transversely oriented incisions 15, which are morely clearly seen in FIG. 1, are cut into the face 11 after the longitudinally oriented incisions 14 have been made. The board 20 is moved by the conveyor belt 21 onto the conveyor belt 27 which is activated when the leading edge of the board 20 has traversed the width of the belt 27 and bumped the trigger switch 28. The board 20 is then carried along a path at right angles to the belt 21 so that the cutting disks 22a may make the incisions 15. Fiberboard 10 is the product.

Several alternatives to the assemblage of cutting disks are contemplated for use as the cutting apparatus of this invention, among which is a metal cylinder having a multiplicity of blades formed around its circumference by a machining operation. Such blades may be axially aligned for cutting the intermittent incisions 15 perpendicular to the longitudinal edges of the fiberboard or circumferentially aligned for cutting the intermittent incisions 14. The circumferentially aligned blades may have arcuate cutting edges instead of the saw tooth shape of the blades 26 but have divergent leading and trailing edges like said blades 26.

Figure 5:
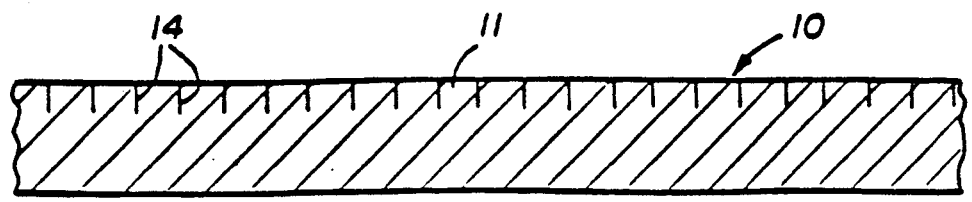
FIG. 5 is an enlarged cross section of a board of this invention showing cuts in its surface region.

The depth and spacing of the incisions 14 are shown in FIG. 5. The depth of the incisions in each face of the fiberboard may be from about 10% to about 30% or even up to about one-third of the thickness of the board. For example, a 0.75 inch thick board may have incisions about 0.25 inch deep in the face which is to be pressed inward by the die having the negative of the desired profile. If the appearance of the obverse face of the molded hardboard is important, both faces will be incised to a depth appropriate to the contours and angles of the die set. The spacing between the parallel paths of the incisions 14 (and of the incisions 15) may be as large as about 0.5 inch but the fidelity of molding and the avoidance of stretch marks are better served by closer spacing, down to as little as about 0.1 inch or even less. It is preferred that a line of incisions in the board's face is generally oriented in the same direction as the margin of the design on a die and is located on the face so that there will be no more than about 0.25 inch between that line and the locus of contact points made by a die when the die set is closed upon the fiberboard.

Conventional conditions of temperatures and pressure may be used for the deep molding of the scored fiberboard between matched die sets. A breathe press cycle is preferred over constant pressure. The surface of the scored fiberboard may be sprayed very lightly with water or an aqueous solution containing 20% urea and 10% of Glidden's Fibertight sealer, by weight, just prior to molding. The specific gravity of the molded hardboard is about 1.0-1.2 and the internal bond strength is 100-200 psi.

Figure 6:
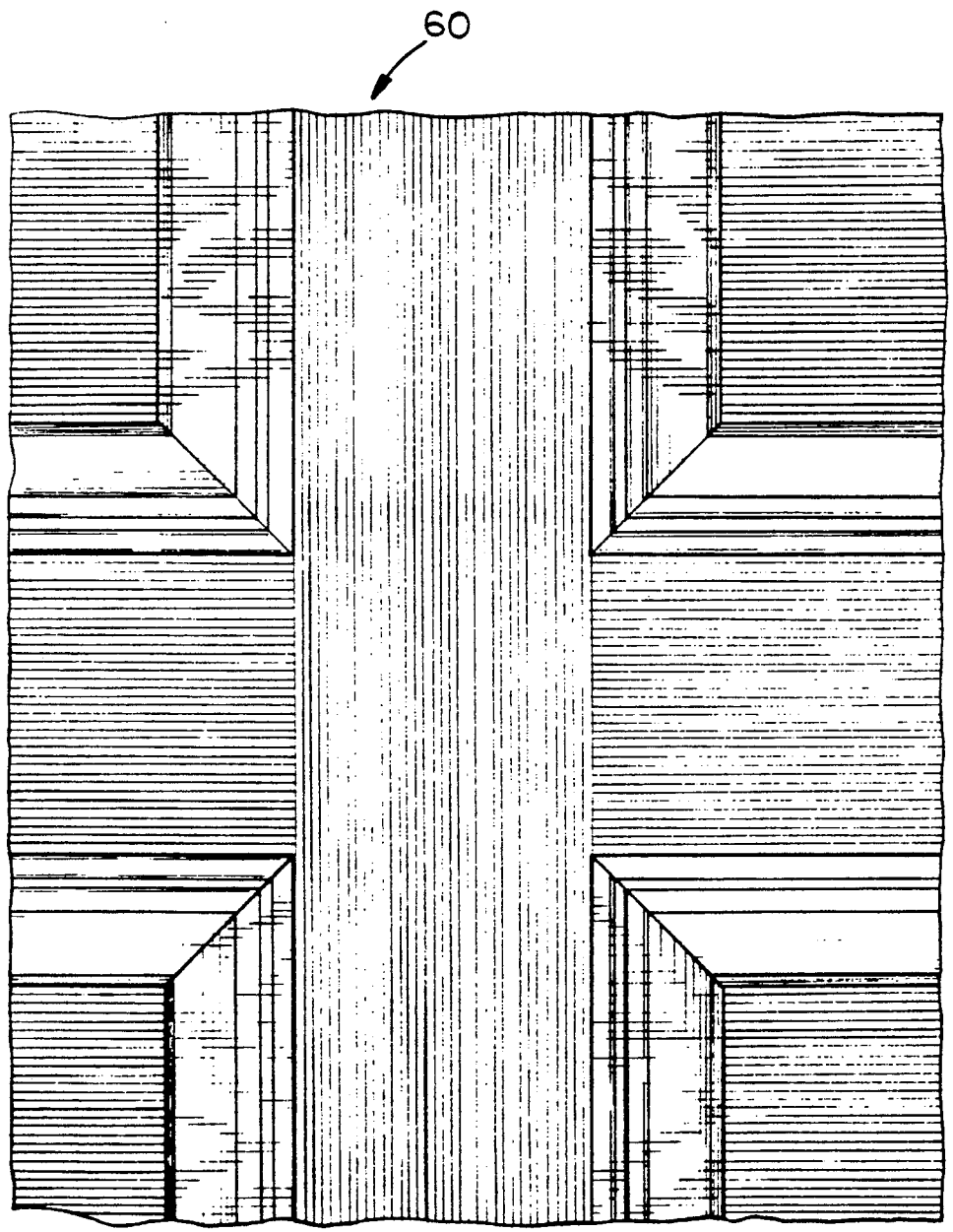
FIG. 6 is a drawing of a deeply molded hardboard made from the incised fiberboard of this invention.
Figure 7:
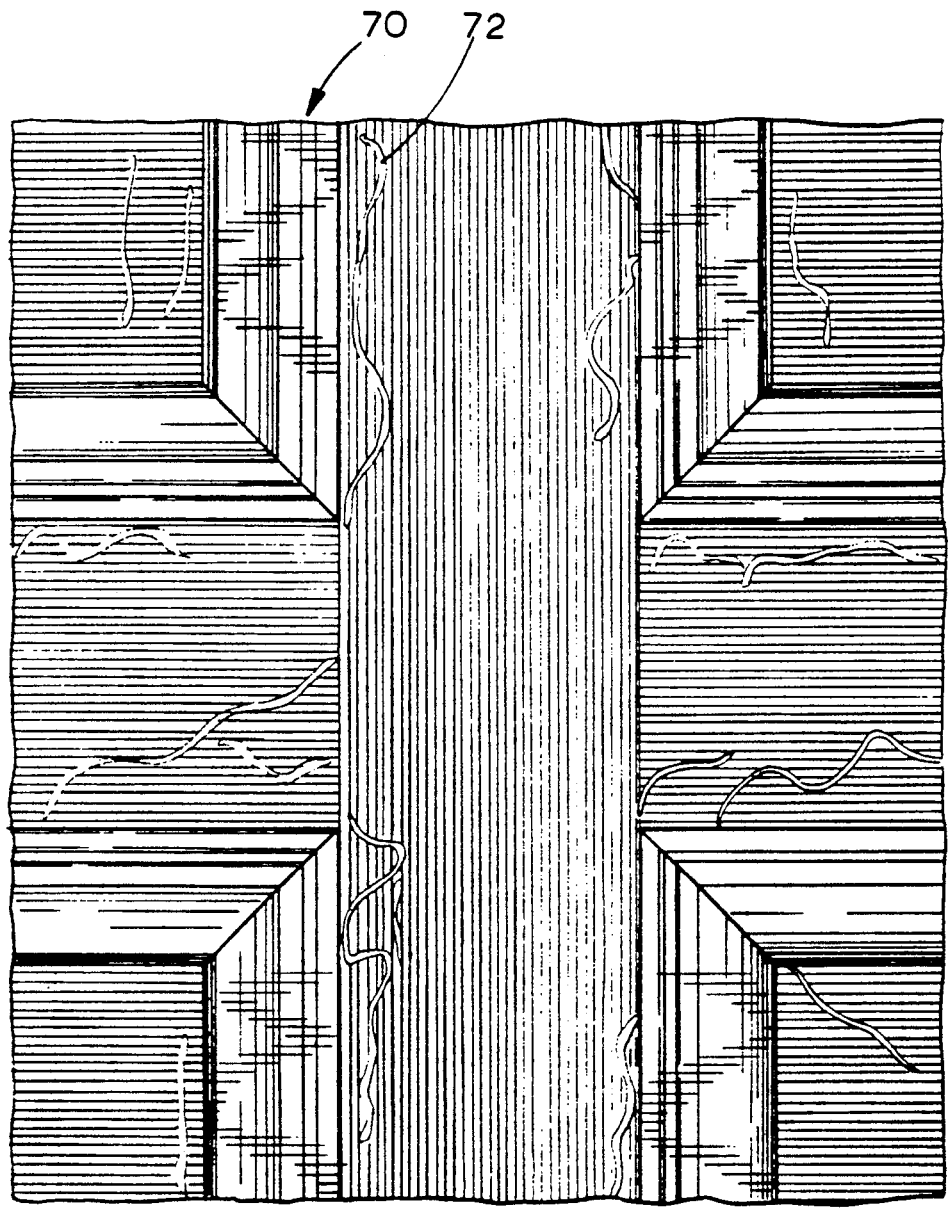
FIG. 7 is a drawing of a deeply molded hardboard made from a fiberboard of the prior art having no incisions.

The molded hardboards 60 and 70 of FIGS. 6 and 7, respectively, were made under substantially the same conditions from redwood fiberboards. A comparison of the hardboard 60 and the hardboard 70 demonstrates the superiority of the product made from the incised fiberboard of this invention. The stretch marks 72, clearly visible in the board 70, are absent from the board 60. These stretch marks are visible as fuzzy lines even on a painted hardboard because of the uneven response to the paint.

It will be appreciated that the invention may be practiced in various ways within the spirit and scope of the following claims.

The subject matter claimed is:

1. A scored board of consolidated fibers comprising a major face with a selected area to be molded, an obserse face, and a plurality of discontinuous incisions on each of said faces.

2. The board of claim 1 molded into a nonplanar hardboard.

3. The board of claim 1 wherein at least some of said discontinuous incisions are arranged on parallel lines, at least some of said fibers are severed, and the ends of said severed fibers are substantially contiguous.

4. The board of claim 1 wherein the depth of said incisions is from about 10% to about one third of the thickness of said board.

5. The board of claim 4 wherein the depth of said incisions is at least about 0.1 inches.

6. The board of claim 1 wherein the depth of said incisions is from about 10% to about 30% of the thickness of said board.

7. The board of claim 1 wherein said fibers are cellulosic.

8. The board of claim 7 comprising a dry mass of water-felted wood fibers.

9. The board of claim 1 wherein at least some of said incisions lie along at least one straight line.

10. The board of claim 9 wherein the distance between adjacent incisions on said straight line is a maximum of about 0.5 inches.

11. The board of claim 9 wherein at least some of said incisions lie along a plurality of parallel straight lines.

12. The board of claim 11 wherein the maximum spacing between adjacent parallel lines is about 0.5 inches.

13. The board of claim 9 wherein at least some of said incisions lie along a plurality of intersecting straight lines.

14. The board of claim 13 wherein at least some of said intersecting lines intersect at right angles.

15. The board of claim 13 wherein said intersecting lines extend over the entirety of said face.

16. The board of claim 1 molded in a contoured die set into a hardboard having a high degree of fidelity to the contours of die set.

17. The hardboard of claim 16 wherein said molded face has a paneled appearance.

18. A scored board of consolidated fibers comprising:
a planar major face and a planar obverse face;
a plurality of discontinuous incisions on each of said faces;
some of said incisions on said major face being aligned in a first direction on said face, having a length of about 0.1 to about 0.5 inches, and being spaced a maximum of about 0.5 inches from adjacent incisions aligned in said direction; and
other of said incisions on said major face being aligned in a second direction on said face and being spaced a maximum of about 0.5 inches from adjacent incisions aligned in said second direction.

19. The board of claim 18 wherein the depth of said incisions is at least about 0.1 inches.

20. The board of claim 18 wherein the depth of said incisions is from about 10% to about one third of the thickness of said board.

21. The board of claim 18 wherein, on each of said faces, said first direction and said second direction are at right angles.

22. The board of claim 18 molded in a contoured die set into a nonplanar hardboard.

23. The hardboard of claim 22 comprising a face having a high degree of fidelity to the contours of the die set.

24. A consolidated scored fiberboard useful for preparing a molded hardboard and comprising a major face and an obverse face, with a plurality of discontinuous incisions on each of said faces, some discontinuous incisions being along a first direction and other discontinuous incisions being along a second direction.

25. The fiberboard of claim 24 consolidated from a water-felted mat.

26. The fiberboard of claim 24 consolidated from a water-felted mat without added binder.

27. The fiberboard of claim 24 consolidated from a water-felted mat and bound together primarily by hydrogen bonding, mechanical interlocking, and native lignin.

28. The fiberboard of claim 24 molded in a contoured die set into a hardboard with a high degree of fidelity to the contours of the die set.

29. The fiberboard of claim 24 molded into a door facing.

30. The fiberboard of claim 24 molded in a contoured die set into a door facing with a high degree of fidelity to the contours of the die set.

* * * * *

UNITED STATES PATENT AND TRADEMARK OFFICE
CERTIFICATE OF CORRECTION

PATENT NO. : 5,306,539

DATED : April 26, 1994

INVENTOR(S) : John T. Clarke, et al.

It is certified that error appears in the above-identified patent and that said Letters Patent is hereby corrected as shown below:

Column 3, line 66, delete "morely" and insert --more-- in lieu thereof.

Column 4, line 66-67, delete "observe" and insert --obverse-- in lieu thereof.

Signed and Sealed this

Sixth Day of September, 1994

Attest:

BRUCE LEHMAN

Attesting Officer

Commissioner of Patents and Trademarks